United States Patent [19]
Johnson

[11] 3,880,011
[45] Apr. 29, 1975

[54] AUTOMATIC SAMPLER
[75] Inventor: Paul R. Johnson, Mineral Wells, Tex.
[73] Assignee: Harsco Corporation, Harrisburg, Pa.
[22] Filed: Feb. 14, 1974
[21] Appl. No.: 442,509

[52] U.S. Cl............ 73/421 B; 73/422 TC; 222/205
[51] Int. Cl. .......................................... G01n 1/14
[58] Field of Search .... 73/421 R, 422 TC; 222/205, 222/425

[56] References Cited
UNITED STATES PATENTS
1,636,630   7/1927   Freeberg............................ 222/205
3,587,670   6/1971   Brailsford......................... 73/421 B Primary Examiner—S. Clement Swisher
Attorney, Agent, or Firm—Cameron, Kerkam, Sutton, Stowell & Stowell

[57] ABSTRACT

Apparatus to draw a sample of metered volume from a source of liquid comprising a cylinder having a sample inlet line leading thereinto and having a pneumatically actuated discharge valve in the lower end thereof through which the sample is dispensed. An air compressor has a suction side connected to the upper end of the cylinder and a discharge side connected to actuate the discharge valve. Electrodes are positioned inside the cylinder for breaking an electrical circuit to the air compressor when the level of liquid in the cylinder completes a circuit between the electrodes thereby automatically opening the pneumatically actuated valve to dispense a meter volume of sample into a receptacle.

12 Claims, 6 Drawing Figures

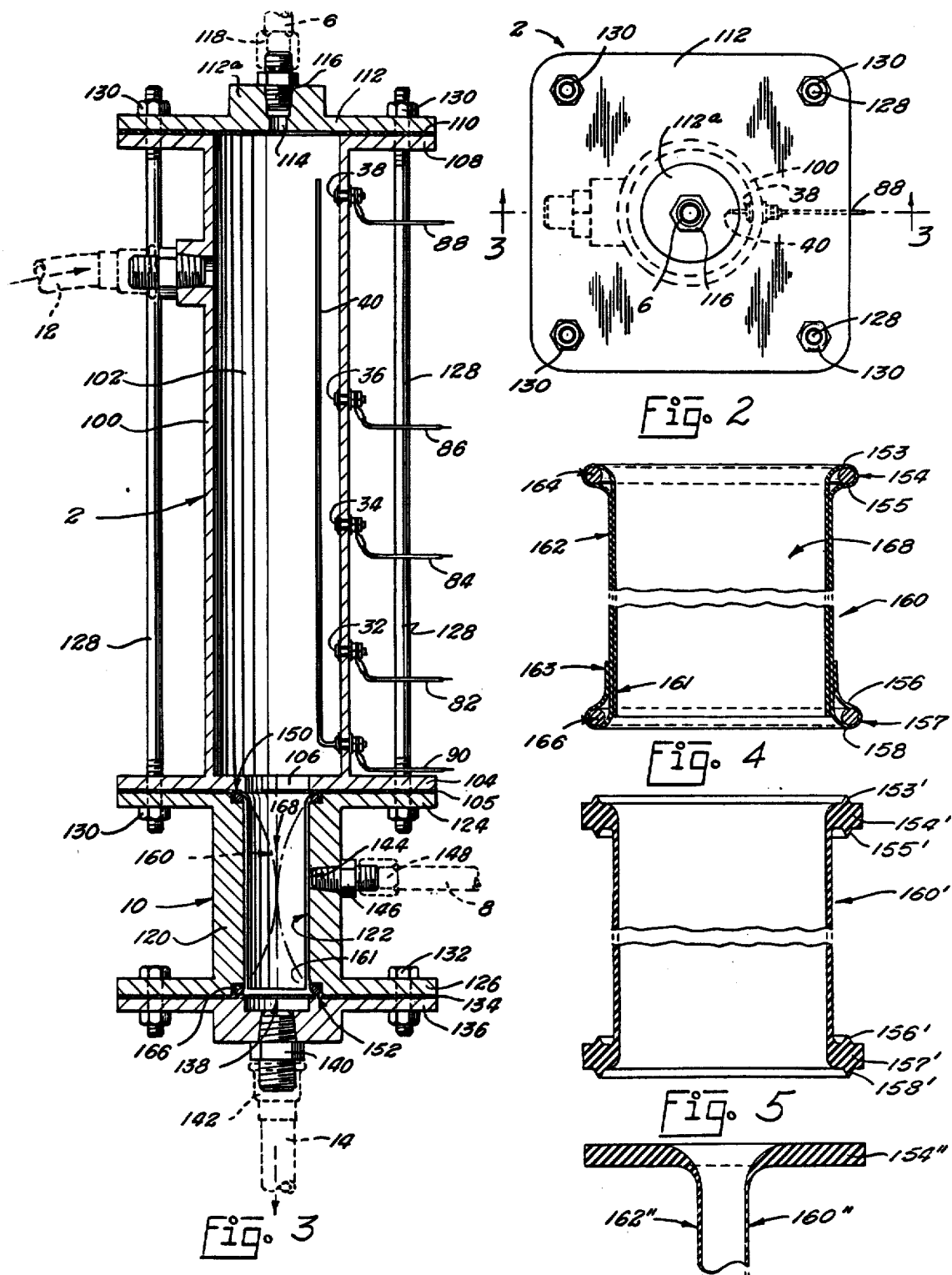

3,880,011

AUTOMATIC SAMPLER

BACKGROUND OF INVENTION

Sewage treatment processes involve the decomposition of liquid sewage by biological oxidation and the reduction of sewage solids by aerobic digestion. Aerobic digestion is achieved by continuous aeration resulting in the addition of oxygen to the sewage until an acceptable percentage of solids has been converted to inert sludge.

Several factors must be taken into consideration to determine the quality of treated water leaving a sewage disposal plant. These factors include BOD (Biological oxygen demand), TSS (total suspended solids), DO (dissolved oxygen) and TOC (total organic carbon), which must be balanced with the micro-organisms for efficient activated sludge treatment to minimize contamination of streams into which the treated fluid is discharged.

Federal and State statutes, regulations, and ordinances specify the minimum quality of treated waste water which may be discharged into water streams.

To maintain optimum conditions in a sewage treatment process raw waste water streams and treated waste water streams must be sampled intermittently at various stages of the treatment process for laboratory analysis so that a record of the treatment can be obtained and periodic adjustments made as required.

It is often necessary to draw periodic samples of water from rivers, streams, and lakes, upstream and downstream from a point of discharge, to monitor the quality of water.

SUMMARY OF INVENTION

I have devised an improved vacuum metering pump particularly adapted for intermittent operation for drawing samples of metered volume from a liquid stream and collecting the samples for storage and testing.

The mechanical system basically comprises an air compressor having suction and pressure lines connectable through solenoid actuated valve means to a sample cell and to a pneumatically actuated valve disposed in an outlet from the sample cell. An electrical system is arranged to energize the compressor and initially direct pressurized air to the pneumatically actuated valve and to the inside of the sample cell to purge a liquid inlet line to the sample cell. After the liquid inlet line has been purged, the electrical system energizes the solenoid actuated valve means to connect the inside of the sample cell to the suction side of the compressor to draw liquid into the sample cell. When liquid rises to a predetermined level in the sample cell the compressor and solenoid actuated valve are de-energized, shifting the solenoid actuated valve to a position wherein the pneumatically actuated valve is opened to discharge the sample of liquid.

A primary object of the invention is to provide a metering pump adapted to take intermittent samples of metered volume from a fluid stream.

Another object of the invention is to provide a metering pump operated by an air compressor such that liquid does not flow through the compressor.

A further object of the invention is to provide a metering pump adapted to intermittently deposit metered samples of liquid into a temperature controlled receptacle to minimize breakdown or changes in composition of samples containing organic material.

Other and further objects of the invention will become apparent upon referring to the detailed description hereinafter following and to the drawings annexed hereto.

DESCRIPTION OF DRAWINGS

Drawings of a preferred embodiment of the invention are annexed hereto so that the invention may be better and more fully understood, in which:

FIG. 2 is a cross-sectional view taken along line 2—2 of FIG. 1;

FIG. 3 is a cross-sectional view taken along line 3—3 of FIG. 2;

FIG. 4 is a cross-sectional view of a first form of the pneumatically actuated valve element;

FIG. 5 is a cross-sectional view of a second form of the valve element; and

FIG. 6 is a cross-sectional view of a third form of the valve element.

Numeral references are employed to designate like parts throughout the various figures of the drawings.

DESCRIPTION OF A PREFERRED EMBODIMENT

Figure 1:
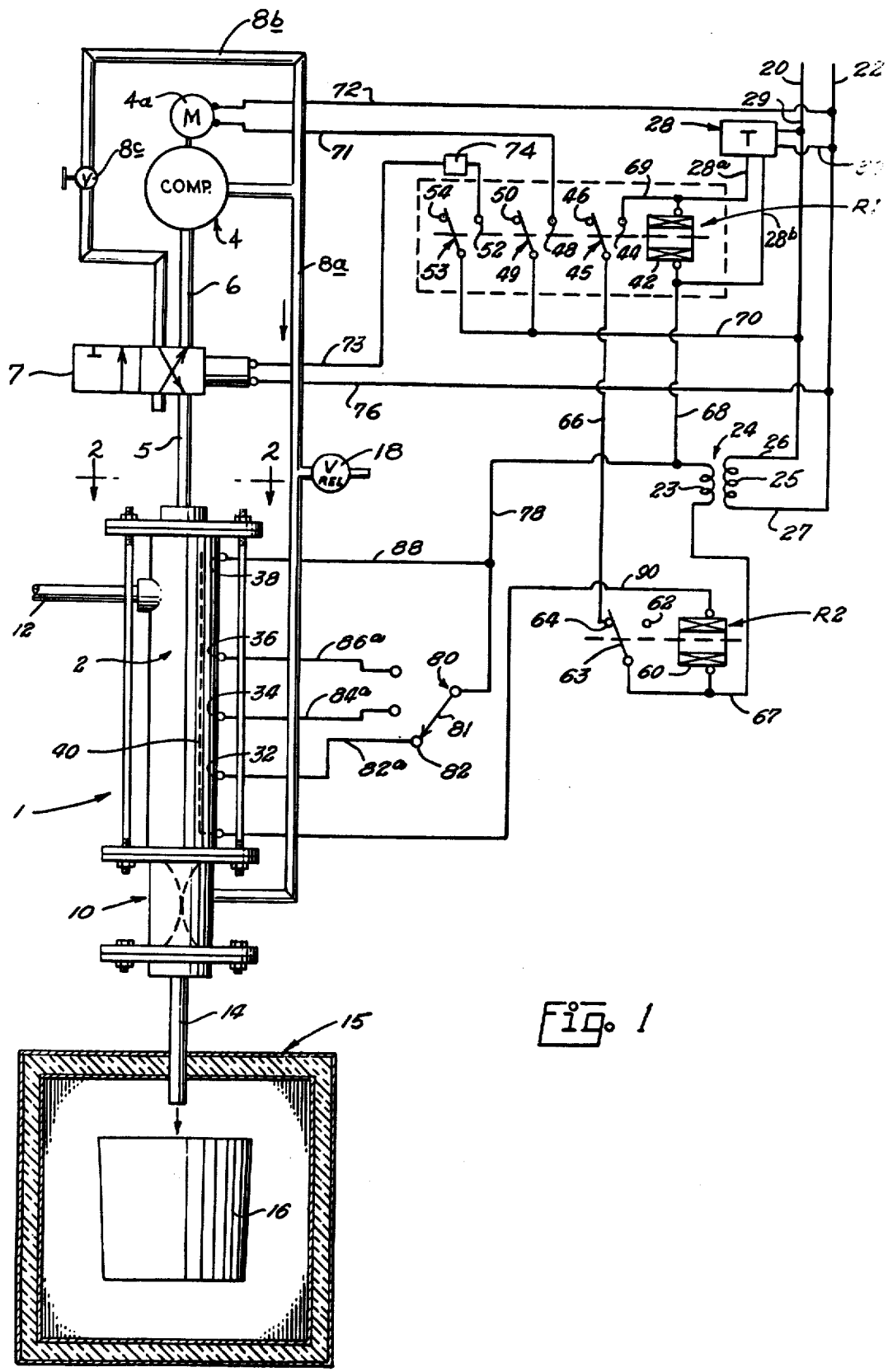
FIG. 1 is a diagrammatic view of the metering pump.

Referring to FIG. 1 of the drawing the numeral 1 generally designates a vacuum metering pump comprising a sample cell 2 having a compressor 4 secured to the upper end thereof through a line 5, suction line 6, the compressor being connected through a pressure line 8a with a pneumatically actuated valve 10 and through pressure line 8b with solenoid actuated valve 7. As will be hereinafter more fully explained, energizing compressor 4 causes valve 10 to be closed and liquid is drawn into the sample cell 2 through an inlet line 12. When the compressor is deenergized valve 10 is opened causing the liquid to drain from sample cell 2 through discharge line 14 into receptacle 16.

Suction line 6 and pressure line 8a have a four-way solenoid actuated valve 7 disposed therein to permit release of both vacuum and pressure at the termination of a sample cycle. In the particular embodiment of the invention illustrated in the drawing, valve 7 in a non-energized condition, will connect pressure lines 8a and 8b to line 5. In an energized condition valve 7 vents pressure line 8b and connects line 5 through line 6 to the suction side of compressor 4. Pressure line 8a is preferably in communication with a suitable pressure regulator such as pressure relief valve 18 permitting adjustment and release of excess pressure.

An automatic control system is employed to intermittently energize compressor 4 and actuate valve 7 to initiate a sampling cycle. An electrical power source such as lines 20 and 22 is provided for operating the compressor 4 and solenoid actuated valve 7. A step-down transformer 24 having a primary winding 25 connected by conductors 26 and 27 to lines 20 and 22 as provided for reducing voltage to operate the automatic switching mechanisms.

An electric timer 28 or other suitable source of control signal is provided to determine the time and frequency of sampling. Timer 28 is connected by conductors 29 and 30 to lines 20 and 22.

Suitable latching relays R1 and R2 are employed in the automatic control circuit and are actuated by the low voltage source across the secondary winding 23 of transformer 24.

A suitable electric recognition system is employed to determine completion of a sampling cycle for unlocking the latching relays to turn off the operating system. The recognition system may consist of liquid level sensing means such as probes or electrodes 32, 34, 36 and 38 and ground electrode 40 mounted in the sample cell 2 or any other means for indicating that the sample being collected is of a specific volume.

The recognition system preferably is variable in order that samples of varying sizes may be obtained if desired. As an example, ground probe 40 may be located at the bottom of the sample cell 2 with one or more probes 32, 34, and 36 secured to the cell wall at such points that a predetermined volume will close the circuit and unlock the latching relays. A selector switch 80 is employed to select the recognition circuit for the size sample desired. An additional circuit 88 connected to electrode 38 is provided at the top of the sample cell as a safety override device in the event of failure of the recognition circuit.

Relay R1 comprises a coil 42, connected by conductors 28a and 28b to timer 28, and poles 45, 49, and 53 which are engageable with normally closed contact 46, 50, and 54 are normally open contacts 44, 46, and 52.

Relay R2 comprises a coil 60 magnetically connected to move pole 63 between normally open contact 62 and normally closed contact 64.

Timer 28 delivers a momentary pulse through conductors 28a and 28b to energize the coil 42 of relay R1 thereby moving pole 45 into engagement with contact 44 to establish a holding circuit through conductor 66 connected between pole 45 of relay R1 and contact 64 of relay R2. The pole 63 of relay R2 is connected through conductor 67 to one side of the secondary winding 23 of transformer 24. The other side of secondary winding 23 is connected through conductor 68 to coil 42 of relay R1 which is connected through conductor 69 to contact 44 of relay R1. Thus, the holding circuit is completed through the coil 42 and relay R1 is held in an energized condition by current through the secondary winding 23 of transformer 24.

Poles 49 and 53 of relay R1 are connected through a conductor 70 to power line 20. Contact 48 of relay R1 is connected through conductor 71 to one side of the winding of motor 4a drivably connected to compressor 4 while the other side of the winding of the motor 4a is connected through a conductor 72 to power line 22. Thus, when relay R1 is energized a circuit is completed through the winding of motor 4a.

Contact 52 is connected through conductor 73 and switch 74 having time-delay closing feature to the coil of solenoid actuated valve 7. The opposite side of the coil of solenoid actuated valve 7 is connected through conductor 76 to power line 22.

When relay R1 is initially energized current flows through line 71 energizing the motor 4a of compressor 4 delivering pressurized air through line 8a to close pneumatically actuated valve 10 and through line 8b, valve 7, line 5, and sample cell 2 to inlet line 12. Thus, pressurized air from compressor 4 purges line 12 upon initiation of each cycle of operation of the apparatus.

At the expiration of a predetermined time interval, for example five seconds, switch 74 will close energizing the coil of valve 7, blocking pressure line 8b and connecting line 5 to suction line 6 to draw liquid through inlet line 12.

One side of the secondary winding 23 of transformer 24 is connected through a conductor 78 to the pole 81 of selector switch 80. Pole 81 is selectively positionable in engagement with contacts 82, 84, or 86. Contact 82 is connected through conductor 82a with electrode 32, contact 84 is connected through conductor 84a with electrode 34, and contact 86 is connected through conductor 86a with electrode 36.

A safety override electrode 38 is connected through conductor 88 to conductor 78.

Ground electrode 40 is connected through a conductor 90 to one side of the coil 60 in relay R2 while the other side of coil 60 is connected through line 67 to the secondary winding 23 of transformer 24.

When liquid is drawn through inlet 12 into sample cell 2 and rises to a level wherein electrode 32 is engaged, a circuit is completed through the liquid between electrode 32 and ground electrode 40, when pole 81 is positioned as illustrated in FIG. 1, thus energizing the coil 60 of relay R2. When coil 60 is energized pole 63 is moved out of engagement with contact 64 breaking the holding circuit through coil 42 of relay R1 thereby stopping flow of current through the winding of motor 4a and de-energizing the coils of solenoid actuated valve 7. When valve 7 is de-energized, valve 7 will shift to a vent position thereby opening the pneumatically actuated valve as lines 8a and 8b are connected to line 5 allowing liquid to drain from sample cell 2 through valve 10 and discharge line 14 into receptacle 16. When valve 5 shifts to the vent position, liquid is also allowed to drain from inlet line 12 back to the source of liquid being sampled.

It should be readily apparent that other automatic control systems and circuits may be employed to energize compressor motor 4a intermittently either in response to lapsed time, for example, by suitable timing mechanism, or in response to movement of a predetermined volume of liquid through a conduit by replacing timer 28 with a flow meter (not shown) adapted to generate a control signal through conductors 28a and 28b after a specified volume of liquid flows through the meter. It should further be appreciated that other equivalent control circuits may be employed in lieu of the illustrated circuit.

Since most water pollution control samples are organic in nature, receptacle 16 is preferably positioned in a refrigerator 15 to prevent major alteration of the sample for example, during a 24 hour period.

Referring to FIGS. 2 and 3 of the drawing sample cell 2 preferably comprises a container of suitable capacity for the collection and momentary storage of a sample of predetermined volume. In the embodiment of the sample cell illustrated in the drawing the container comprises a hollow cylindrical member 100 having a longitudinally extending bore 102. The lower end of cylinder 100 is welded or otherwise secured to a plate 104 having a central passage 106 extending therethrough which forms a flange about the lower end of cylindrical member 100.

The upper end of cylinder 100 is welded or otherwise secured to a plate 108 forming a flanged upper end. Suitable sealing means, such as resilient gasket 110, is positioned between flange plate 108 and cover 112 forming an air tight connection therebetween. Cover 112 has an aperture 114 extending therethrough into which is threadedly secured an adaptor 116 connectable to suction line 5 by a suitable means such as threaded connector 118.

Pneumatically actuated valve 10 preferably comprises a hollow sleeve 120 having a bore 122 extending therethrough and having flanges 124 and 126 secured to opposite ends thereof.

In the embodiment of the invention illustrated in FIG. 3 of the drawing, flange plates 104 and 108 adjacent opposite ends of cylinder 100, cover 112 and flange 124 on sleeve 120 have axially aligned apertures formed therein through which bolts 128 extend. The ends of bolts 128 are threaded to receive nuts 130 to urge cover 112 and gasket 110 into sealing engagement with flange plate 108 and to urge flange 124 and gasket 105 into sealing engagement with flange plate 104.

Bolts 132 extend through an axially aligned opening in flange 126, gasket 134 and closure member 136. Closure 136 has a central opening 138 extending therethrough into which a threaded adaptor 140 is secured connectable by a coupling 142 with discharge line 14.

Sleeve 120 has a port 144 extending through the wall thereof intermediate opposite ends of bore 122. A threaded adaptor 146 is secured in port 144 for connection by a threaded coupling 148 to pressure line 8.

Annular grooves 150 and 152 are formed in sleeve 120 adjacent opposite ends of bore 122 to receive and grippingly engage upper and lower surfaces of annular rings 154 and 157 extending about valve element 160.

A first form of the valve element is illustrated in FIG. 4 of the drawing, while second and third forms of the valve element are illustrated in FIGS. 5 and 6.

The form of the valve element illustrated in FIG. 4 comprises a continuous rubber or elastomeric plastic tube having a first end 161, and intermediate section 162, and a second end 163. To form the valve element 160 a rigid ring 164 is inserted into the resilient tube and the end 161 of the tube is folded through the ring 164 to extend into the intermediate section 162 of the tube. The opposite end 163 of the resilient tube is inserted through a ring 166 and folded around the outer surface of the ring such that a portion of the intermediate section 162 of the tube extends into the end 163 thereof.

It should be readily apparent that ring 164 forms an annular ring 154 about one end of valve element 160 while ring 166 forms a second annular ring 157 about the opposite end thereof. The annular ring 154 is positioned in annular groove 150, formed in sleeve 120, such the tightening of nuts 130 urges the upper surface 153 of annular ring 154 into sealing engagement with the lower surface of gasket 105 and the lower surface 155 is urged into sealing engagement with the edge of the annular groove 150. As bolts 132 are tightened the upper surface 156 of annular ring 157 is ruged into sealing engagement with the edge of annular groove 152 while the lower surface 158 is urged into sealing engagement with gasket 134.

From the foregoing it should be readily apparent that an annular chamber is formed between the wall of the bore 122 and the wall of valve element 160, since annular rings 154 and 157 are urged into sealing engagement with surfaces formed in the annular grooves 150 and 152. Thus, delivery of pressurized fluid from pressure line 8 through port 144 into bore 122 causes walls of valve element 160 to collapse to the position illustrated by the dashed outline in FIG. 3 thereby closing the valve and preventing flow of liquid from the bore 102 of cylindrical member 100. It should further be appreciated that the partial vacuum in bore 102 and inside the central passage 168 of valve element 160 will also tend to hold the walls of the valve element in a collapsed condition.

The modified form of the valve element illustrated in FIG. 5 comprises an integral body 160' molded of resilient material and having annular rings 154' and 157' of reinforced construction adjacent opposite ends thereof. Sealing beads 153' and 155' are formed on opposite sides of annular ring 154' and seal beads 156' and 158' are formed on upper and lower surfaces of annular ring 157'.

The third form of the valve element illustrated in FIG. 6 comprises an integral body 160'' molded of resilient material and having a central section 162'' which has an outside diameter substantially less than the diameter of bore 122 extending through sleeve 120 thereby preventing physical engagement of outer surfaces of the central portion 162'' with the wall of bore 122 when pressure is relieved from line 8a. Annular rings 154'' and 157'' extend about upper and lower ends of valve element 160''.

The operation and function of the apparatus hereinbefore described should be readily apparent from the foregoing description of the control apparatus. However, a brief description of a cycle of operation of the apparatus is as follows:

The end of inlet line 12 is positioned in a source of fluid from which periodic samples are to be taken.

Timer 28 is adjusted to deliver a control signal through lines 28a and 28b at predetermined intervals, for example, every hour during a 24 hour period. If a flow meter were employed in lieu of timer 28, such meter would be adjusted to deliver a control signal every time a predetermined volume of liquid flows therethrough.

In the normal de-energized condition compressor motor 4a is turned off and valve 7 is in a position to connect lines 8a and 8b and line 5 thereby equalizing pressure in central passage 168 of valve element 160 and in bore 122 of sleeve 120.

When a command signal is received to initiate a cycle, relay R1 is held in an energized condition as hereinbefore described and compressor motor 4a is turned on prior to the shifting of valve 7 to purge the inlet line 12 and close valve 10. As switch 74 closes valve 7 is shifted for connection of line 5 and consequently the inside of cylinder 100 to the suction side of compressor 4. Pressure line 8a remains connected to the pressure side of the compressor 5 and to the inside of bore 122 of sleeve 120 thereby maintaining valve element 160 collapsed.

The partial vacuum in the bore 102 of cylinder 100 draws liquid through inlet line 12 into the bore 102 until liquid reaches the level of contact 32, 34, or 36 as selected by the positioning of pole 81 of switch 80.

As the surface of liquid reaches the selected electrode, the coil 60 of relay R2 is energized breaking the holding circuit through the coil 32 of relay R1, as hereinbefore described, terminating the cycle of operation of the sampling apparatus when a volume controlled by a positioning of the electrodes has been drawn.

Upon completion the cycle of operation valve 7 is automatically shifted to a vent position thereby connecting the bore 102 of cylinder 100 to the bore 122 permitting the resilient body of valve element 160 to return to the relaxed position as pressure is released from lines 8a and 8b through valve 7.

Relaxation of the body portion of valve element 160 opens the passage 168 therethrough permitting gravity flow of liquid from bore 102 downwardly through discharge line 14 into receptacle 16.

Venting the bore 102 through valve 7 also causes gravity flow of liquid downwardly through inlet line 12 into the source of liquid being sampled thereby partially cleaning the line preparatory for subsequent cycle assuring that a fresh sample will be drawn during each cycle of operation.

It should be readily apparent that the apparatus hereinbefore described accomplishes the objects of the invention hereinbefore enumerated and that other and further embodiments of the invention may be devised without departing from the basic concept thereof.

Having described my invention, I claim:

1. Apparatus to draw a metered quantity of liquid comprising: a container having an inlet passage and a discharge passage; a pump having a suction line and a pressure line; means to connect the suction line of the pump to said container to reduce pressure in said container to draw liquid through said inlet passage; a pressure actuated valve in said outlet passage, said valve being normally open; means to connect said pressure line to said pressure actuated valve; means to drive said pump to close said pressure actuated valve; and means to vent the container and the pressure actuated valve when a predetermined volume of liquid has been drawn into said container.

2. The combination called for in claim 1 wherein the means to vent the container and the pressure actuated valve comprises: liquid level sensing means in said container; and control valve means in the suction line and pressure line and connected to said sensing means.

3. The combination called for in claim 2 wherein the sensing means comprises: an electrical circuit connected to said valve means; a ground conductor in said container connected to the circuit; vertically spaced electrodes in said container; and selector means to connect one of said electrodes to said circuit.

4. The combination called for in claim 3 with the addition of: means to generate a command signal; latching means in said circuit connected to energize said pump, and to actuated said valve means from a vent position connecting the suction line to the container and the pressure line to the pressure actuated valve; means to deliver the command signal to said latching means; and means to connect said selector means to said latching means to open a circuit to the latching means when liquid engages the electrode connected to the selector means.

5. The combination called for in claim 1 wherein the means to connect the suction line of the pump to the container comprises a two position, four-way valve having first and second inlet ports and first and second outlet ports; means to connect the pressure line of the pump to the first inlet port; means to connect the first outlet port to the container; means to connect the first inlet port and the first outlet port when the valve is in a first position; means to connect the second inlet port to the container; means to connect the second outlet port to the suction line of the pump; and means to connect the second inlet and the second outlet when the valve is in a second position.

6. The combination called for in claim 5 with the addition of current responsive actuating means connected to said four-way valve; time-delay switch means connected to said actuating means to prevent movement of the valve from the first position to the second position until said pump has been energized a predetermined time interval; and a source of electricity connected to said switch means and to said means to drive the pump.

7. The combination called for in claim 1 wherein the pressure actuated valve comprises: a sleeve having a longitudinally extending bore and having a port communicating with said bore; means to connect said sleeve about said discharge passage; a resilient tube in the bore of said sleeve; means to secure opposite ends of the tube to spaced portions of said sleeve on opposite sides of said port; and means to connect the pressure line of the pump to the port in the sleeve.

8. The combination called for in claim 7 wherein the tube comprises: an elastomeric cylindrical member having first and second ends and an intermediate section; a first ring; and a second ring, said first ring being positioned inside the cylindrical member and said second ring being positioned around the intermediate section of the cylindrical member, the first end of the cylindrical member being folded through the first ring and the second end of the cylindrical member being folded around the second ring.

9. The combination called for in claim 7 wherein the tube comprises: an integral hollow body of resilient material; an annular ring about each end of the body.

10. The combination called for in claim 9 with the addition of sealing beads on each of said annular rings.

11. Apparatus to draw a metered quantity of liquid comprising: a hollow container, said container having an inlet passage intermediate opposite ends thereof and an outlet passage at the lower end; a sleeve having a bore, said sleeve having a port intermediate opposite ends of the bore; means securing the sleeve to the container such that the outlet passage is in communication with the bore; a resilient tube; means securing opposite ends of said tube in sealed relation with walls of the bore on opposite sides of said port; a pump having a suction side and a pressure side; means to connect the pressure side to the inside of the hollow container; means to connect the pressure side to said port; means to drive said pump; liquid level sensing means in the container; and means to connect the sensing means to de-energize the means to drive the pump when liquid in the container reaches a predetermined level.

12. The combination called for in claim 11 with the addition of a receptacle to receive liquid from said tube; and means to control temperature of the receptacle.

* * * * *